(12) United States Patent
Yamanaka et al.

(10) Patent No.: US 7,378,823 B2
(45) Date of Patent: May 27, 2008

(54) MULTI-OUTPUT TYPE DC/DC CONVERTER WITH A CONSTANT ON TIME INTERVAL IN A STEADY STATE

(75) Inventors: Yuji Yamanaka, Kanagawa (JP); Keizo Kumagai, Kanagawa (JP); Tatsuya Inenaga, Tokyo (JP); Takeshi Satou, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 43 days.

(21) Appl. No.: 11/320,087

(22) Filed: Dec. 28, 2005

(65) Prior Publication Data
US 2006/0221649 A1 Oct. 5, 2006

(30) Foreign Application Priority Data
Mar. 31, 2005 (JP) .............................. 2005-100879
Jun. 23, 2005 (JP) .............................. 2005-183876

(51) Int. Cl.
*G05F 1/577* (2006.01)
(52) U.S. Cl. ................. 323/267; 323/222; 323/282
(58) Field of Classification Search ................ 323/222, 323/267, 272, 282, 351
See application file for complete search history.

(56) References Cited

U.S. PATENT DOCUMENTS

| 5,612,610 A * | 3/1997 | Borghi et al. ............... 323/222 |
| 5,896,284 A * | 4/1999 | Murasato et al. ........... 323/267 |
| 6,201,374 B1 * | 3/2001 | Ater et al. .................. 323/267 |
| 6,222,352 B1 | 4/2001 | Lenk |
| 6,437,545 B2 * | 8/2002 | Sluijs ......................... 323/222 |
| 6,600,300 B2 * | 7/2003 | Groeneveld et al. ........ 323/222 |
| 6,636,022 B2 * | 10/2003 | Sluijs ......................... 323/267 |
| 6,900,620 B2 | 5/2005 | Nishimori et al. |
| 6,984,963 B2 * | 1/2006 | Pidutti et al. ............... 323/207 |
| 7,064,527 B2 * | 6/2006 | Adragna ..................... 323/207 |
| 7,176,661 B2 * | 2/2007 | Kranz ......................... 323/222 |
| 2002/0011824 A1 * | 1/2002 | Sluijs ......................... 323/222 |
| 2004/0036450 A1 * | 2/2004 | Aiello et al. ................ 323/222 |
| 2004/0095101 A1 * | 5/2004 | Pidutti et al. ............... 323/222 |
| 2006/0176031 A1 * | 8/2006 | Forman et al. ............. 323/267 |

FOREIGN PATENT DOCUMENTS

| JP | 11-168876 A | 6/1999 |
| JP | 2004-96816 A | 3/2004 |

OTHER PUBLICATIONS

Related U.S. Appl. No. 11/320,088, filed Dec. 28, 2005; Inventor: Y. Yamanaka et al.

* cited by examiner

*Primary Examiner*—Jeffrey Sterrett
(74) *Attorney, Agent, or Firm*—Frishauf, Holtz, Goodman & Chick, P.C.

(57) ABSTRACT

In a multi-output type DC/DC converter, a controller controls, in accordance with first and second output voltages, turning on/off of a switch circuit and selection in an output selection circuit. The controller controls an ON time interval in each time slot of the switch circuit so as to always constant in a steady state without reference to weight of first and second loads.

14 Claims, 12 Drawing Sheets

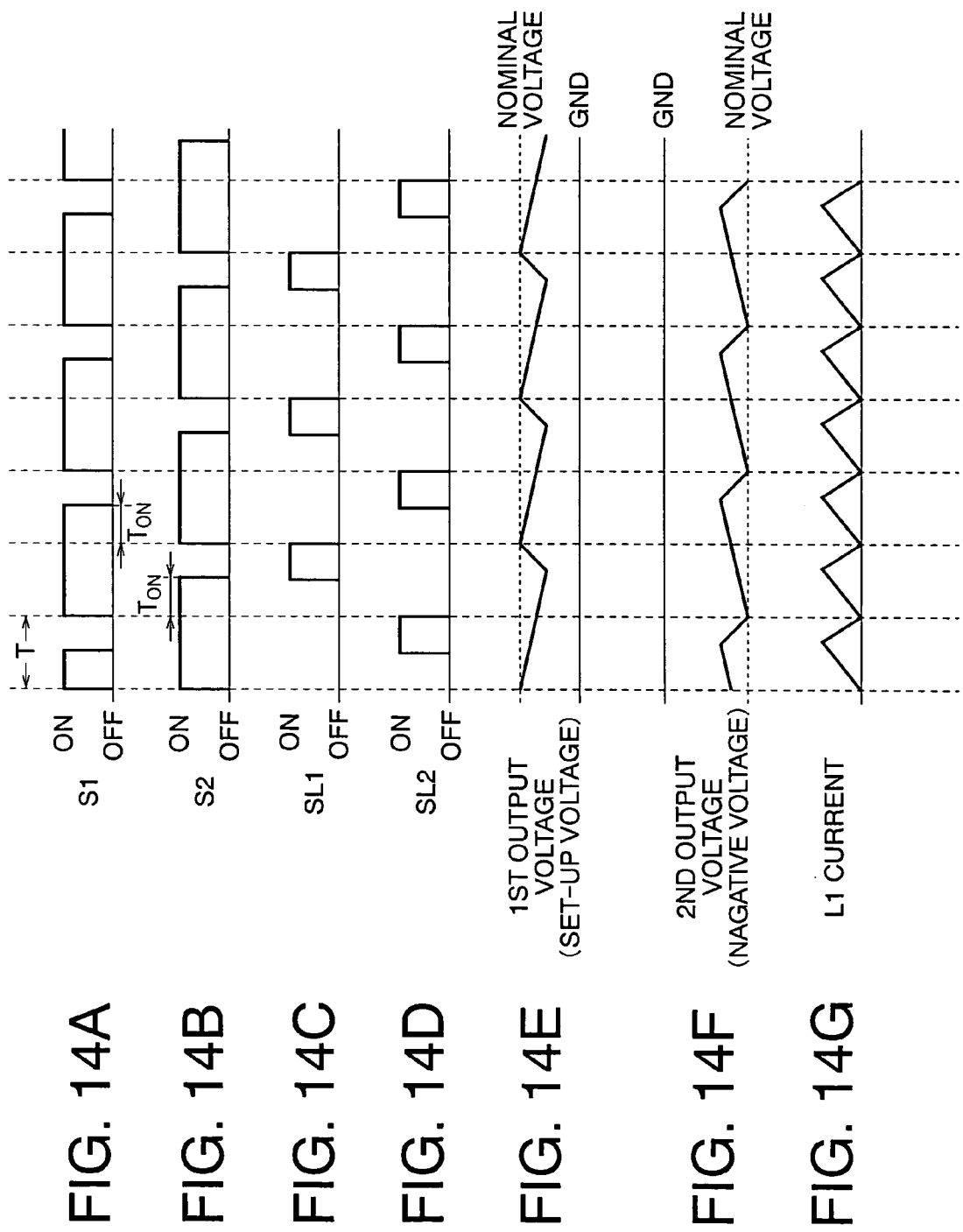

MULTI-OUTPUT TYPE DC/DC CONVERTER WITH A CONSTANT ON TIME INTERVAL IN A STEADY STATE

This application claims priority to prior applications JP 2005-100879 and JP 2005-183876, the disclosure of which is incorporated herein by reference.

BACKGROUND OF THE INVENTION

This invention relates to a power converter and, in particular, to a multi-output type DC/DC converter for producing a plurality of output voltages using a switch circuit and a control method thereof.

In the manner which is well known in the art, the DC/DC converter is a power converter for converting an input DC voltage into an output DC voltage which is different from the input DC voltage. In addition, there is a case where a plurality of different output DC voltages (which will later be merely also called "output voltages") are supplied to a plurality of loads for the input DC voltage (which will later be merely also called "input voltage"). Such DC/DC converters for generating a plurality of output voltages are classified into division type DC/DC converters and multi-output type DC/DC converters.

The division type DC/DC converter is a circuit which comprises a plurality of switch circuits which are equal in number to the loads (outputs) and supplies powers (outputs voltages) with the respective loads. On the other hand, the multi-output type DC/DC converter is a circuit for generating a plurality of output voltages using a single switch circuit.

In the multi-output type DC/DC converter, a plurality of loads are supplied with necessary energy by carrying out time division control to divide a switching frequency (or to pre-assign time slots). Such a multi-output type DC/DC converter is disclosed, for example, in Japanese Unexamined Patent Publication Tokkai No. 2004-96816 or JP 2004-96816 A.

In a conventional multi-output type DC/DC converter, by regulating an ON time interval (a duty factor) in the switch circuit for respective loads each switching period (the time slot), each load is supplied with necessary power. In other words, in the multi-output type DC/DC converter, the time slots are pre-assigned with each load and each load is supplied with necessary power within each time slot. Accordingly, it is necessary to make a current flowing in an inductor zero until an end time point of each time slot. Otherwise, magnetic energy left in the inductor is released in another load at the next time slot.

As described above, an operation mode making the multi-output DC/DC converter so as to make the current flowing in the inductor zero before switching from a time slot to the next time slot is called a "current discontinuous mode" in the art. On the other hand, another operation mode making the multi-output DC/DC converter in a state where the current flowing in the inductor does not become zero at a time instant when a time slot is switched to the next time slot is called a "current continuous mode" in the art.

In the conventional multi-output type DC/DC converter, there is a phenomenon such that the current flowing in the inductor does not become zero in an abnormal condition where any of the loads becomes an over-load. In order to resolve this problem, the above-mentioned JP 2004-96816 A discloses a technical idea which can make the current flowing in the inductor zero at the abnormal condition such as an over-load state. However, it is disadvantageous in that a controller has a complicated structure because a complicated control is required to realize the technical idea.

In addition, a switching power supply circuit or a switching regulator using a single inductor is known, for example, in U.S. Pat. No. 6,900,620 issued by Nishimori et al. In the switching power supply circuit, time slots are pre-assigned with loads. It will be assumed that the loads are equal in number two. In this even, the time slots are alternately assigned the two loads. The switching power supply circuit regulates, in accordance with weight of the loads, a time interval (duty factor) necessary for turning a main switch on in order to flow a current from an input power supply to the single inductor. In addition, according to Nishimori et al., an embodiment in which energy filling time intervals for the two loads are different from each other is disclosed.

Furthermore, a two-output type DC/DC conversion circuit, which controls output voltages so as to keep constant by controlling an operation duty of a switching element using a single DC reactor, is disclosed, for example, in Japanese Unexamined Patent Publication Tokkai Hei No. 11-168876 or JP 11-168876 A. Accordingly, in a two-output type converter, an ON time interval (duty factor) of the switching element varies in accordance with weight of the loads.

In addition, a multiple output back converter using a single inductor to control turning on/off of switching means by a pulse width modulator is disclosed, for example, in U.S. Pat. No. 6,222,352 issued by Lenk. In the back converter, voltage outputs are regulated and controlled by controlling a duty cycle and an ON time interval of the switching means.

Disclosed in the above-mentioned patent documents, any multi-output type DC/DC converter regulates an ON time interval for turning switching means (a switch for flowing a current from an input power supply to an inductor) on in accordance with weight of loads. Accordingly, any multi-output type DC/DC converter, which is disclosed in the above-mentioned patent documents, can operate only at the current discontinuous mode.

SUMMARY OF THE INVENTION

It is therefore an object of the present invention to provide a multi-output type DC/DC converter which is capable of adapting a heavy load with flexibility without complicated control.

Other objects of this invention will become clear as the description proceeds.

On describing the gist of a first aspect of this invention, it is possible to be understood that a multi-output type DC/DC converter is for generating, from an input voltage, a plurality of output voltages using a switch circuit to supply the plurality of output voltages to a plurality of loads corresponding thereto. According to the first aspect of this invention, in the above-mentioned multi-output type DC/DC converter, the switch circuit has an ON time interval in each time slot that is constant in a steady state without reference to weight of the plurality of loads.

According to the first aspect of this invention, the above-mentioned multi-output type DC/DC converter may determine frequency assigned with the time slots in accordance with power to be supplied to each load. Alternatively, the above-mentioned multi-output type DC/DC converter may supply energy to the load requiring the most energy for preference. In addition, the above-mentioned multi-output type DC/DC converter may operate at a current discontinuous mode when all of the loads are light while the above-mentioned multi-output type DC/DC converter may operate at a current continuous mode when all of the loads are heavy.

On describing the gist of a second aspect of this invention, it is possible to be understood that a method is of controlling a multi-output type DC/DC converter for generating, from an input voltage, a plurality of output voltages using a switch circuit to supply the plurality of output voltages to a plurality of loads corresponding thereto. According to the second aspect of this invention, the method comprises the step of controlling an ON time interval in each time slot of the switch circuit so as to become constant in a steady state without reference to weight of the plurality of loads.

According to the second aspect of this invention, the afore-mentioned method may comprise the step of determining frequency assigned with time slots in accordance with power to be supplied to each load. Alternatively, the afore-mentioned method may comprise the step of controlling so as to supply energy to the load requiring the most energy for preference. In addition, the afore-mentioned method may comprise the step of controlling so as to make the multi-output type DC/DC converter operate at a current discontinuous mode when all of the loads are light and to make the multi-output type DC/DC converter operate at a current continuous mode when all of the loads are heavy.

On describing the gist of a third aspect of this invention, it is possible to be understood that a multi-output type DC/DC converter generates, from an input voltage, first through N-th output voltages to supply the first through N-th output voltages to first through N-th loads, respectively, where N represents an integer which is not less than two. According to the third aspect of this invention, the multi-output type DC/DC converter comprises a switch circuit for switching the input voltage to produce an AC voltage, first through N-th rectifying and smoothing circuits for producing the first through N-th output voltages, an output selection circuit for selecting, as a selected rectifying and smoothing circuit, one of the first through N-th rectifying and smoothing circuits each time slot to supply the AC voltage to the selected rectifying and smoothing circuit, and a controller for controlling turning on/off of the switching circuit and selection in the output selection circuit in accordance with the first through N-th output voltages. The controller controls an ON time interval in each time slot of the switch circuit so as to always become constant in a steady state without reference to weight of the first through N-th loads.

According to the third aspect of this invention, in the above-mentioned multi-output type DC/DC converter, the controller may control the selection in the output selection circuit in accordance with power to be supplied to the first through N-th loads on the basis of the first through N-th output voltages to determine frequency assigned with the time slots each load. Alternatively, the controller may control the selection in the output selection circuit so as to decide, as a decided load, one among the first though N-th loads that requires the most energy on the basis of the first though N-th output voltages to supply the decided load with energy for preference. In addition, the controller may make the multi-output type DC/DC converter operate at a current discontinuous mode when all of the loads are light and the controller may make the multi-output type DC/DC converter operate at a current continuous mode when all of the loads are heavy.

According to the third aspect of this invention, in the above-mentioned multi-output type DC/DC converter, the switch circuit may comprise an inductor and a main switch. When the main switch is turned on, a current flows in the inductor to accumulate magnetic energy in the inductor. When the main switch is turned off, the magnetic energy accumulated in the inductor is released into the output selection circuit. The output selection circuit may comprise first through N-th selection switches which correspond to the first through N-th loads, respectively.

According to the third aspect of this invention, in the above-mentioned multi-output type DC/DC converter, the controller may comprise first through N-th detection circuits for detecting the first through N-th output voltages to produce first through N-th detected signals, respectively, an oscillator for oscillating a clock signal, a rectifying switch control circuit for producing, in synchronism with the clock signal, a control signal for controlling the main switch and first though N-th output selection signals for selecting the first through N-th selection switches on the basis of the first through N-th detected signals, and a pulse width modulator for generating a pulse width modulated signal for turning the main switch on/off on the basis of the control signal.

According to the third aspect of this invention, in the above-mentioned multi-output type DC/DC converter, the controller may comprise first through N-th detection circuits for detecting the first through N-th output voltages to produce first through N-th detected signals, respectively, an oscillator for oscillating an oscillation signal with a waveform portion whose amplitude varies continuously, a control circuit for comparing the oscillation signal with the first through N-th detected signals to produce a control signal for controlling the main switch and first though N-th output selection signals for selecting the first through N-th selection switches, and a pulse width modulator for generating a pulse width modulated signal for turning the main switch on/off on the basis of the control signal.

According to the third aspect of this invention, in the above-mentioned multi-output type DC/DC converter, the controller may comprise first through N-th detection circuits for detecting the first through N-th output voltages to produce first through N-th detected signals, respectively, an oscillator for oscillating a clock signal, a main control circuit for producing, in synchronism with the clock signal, a control signal on the basis of the first through N-th detected signals, a pulse width modulator for generating a pulse width modulated signal for turning the main switch on/off on the basis of the control signal, and a switch control circuit for generating, on the basis of the pulse width modulated signal, an output selection signal for controlling turning on/off of the first though N-th output selection switches.

BRIEF DESCRIPTION OF THE DRAWINGS

FIGS. 14A through 14G are time charts for use in describing operation of the multi-output type DC/DC converter illustrated in FIG. 13.

DESCRIPTION OF THE PREFERRED EMBODIMENTS

Figure 1:
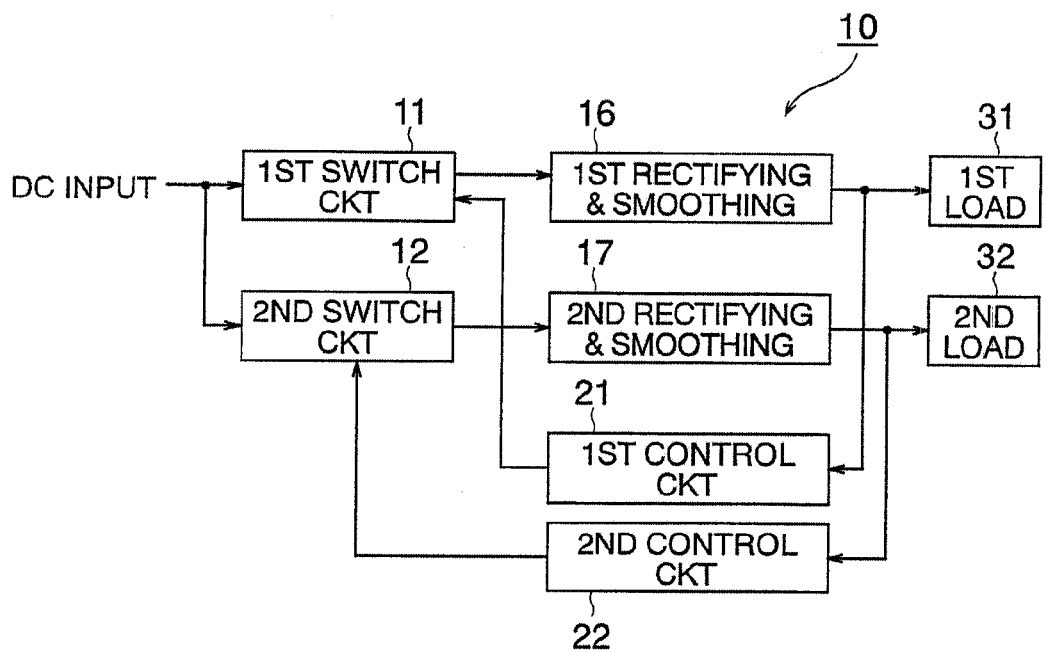
FIG. 1 is a block diagram showing structure of a conventional division type DC/DC converter.

Referring to FIG. 1, a conventional division type DC/DC converter 10 will first be described in order to facilitate an understanding of the present invention. In the example being illustrated, the division type DC/DC converter 10 illustrates a case where loads (outputs) are equal in number two.

The illustrated division type DC/DC converter 10 comprises first and second switch circuits 11 and 12, first and second rectifying and smoothing circuits 16 and 17, and first and second control circuits 21 and 22. Although illustration is omitted, each of the first and the second switch circuits 11 and 12 comprises a coil (an inductor) and a main switch.

The first switch circuit 11 switches an input voltage to produce a first AC voltage. The first rectifying and smoothing circuit 16 rectifies and smoothes the first AC voltage to produce a first output voltage. The first output voltage is supplied to a first load 31. The first control circuit 31 controls the first switch circuit 11 so as to make the first output voltage constant. More specifically, the first control circuit 21 supplies the first switch circuit 11 with a first pulse width modulated (PWM) signal which has a constant frequency and a pulse width varying in accordance with necessary power to be supplied to the first load 31.

Likewise, the second switch circuit 12 switches the input voltage to produce a second AC voltage. The second rectifying and smoothing circuit 17 rectifies and smoothes the second AC voltage to produce a second output voltage. The second output voltage is supplied to a second load 32. The second control circuit 22 controls the second switch circuit 12 so as to make the second output voltage constant. More specifically, the second control circuit 21 supplies the second switch circuit 12 with a second pulse width modulated (PWM) signal which a constant frequency and a pulse width varying in accordance with necessary power to be supplied to the second load 32.

Figure 2:
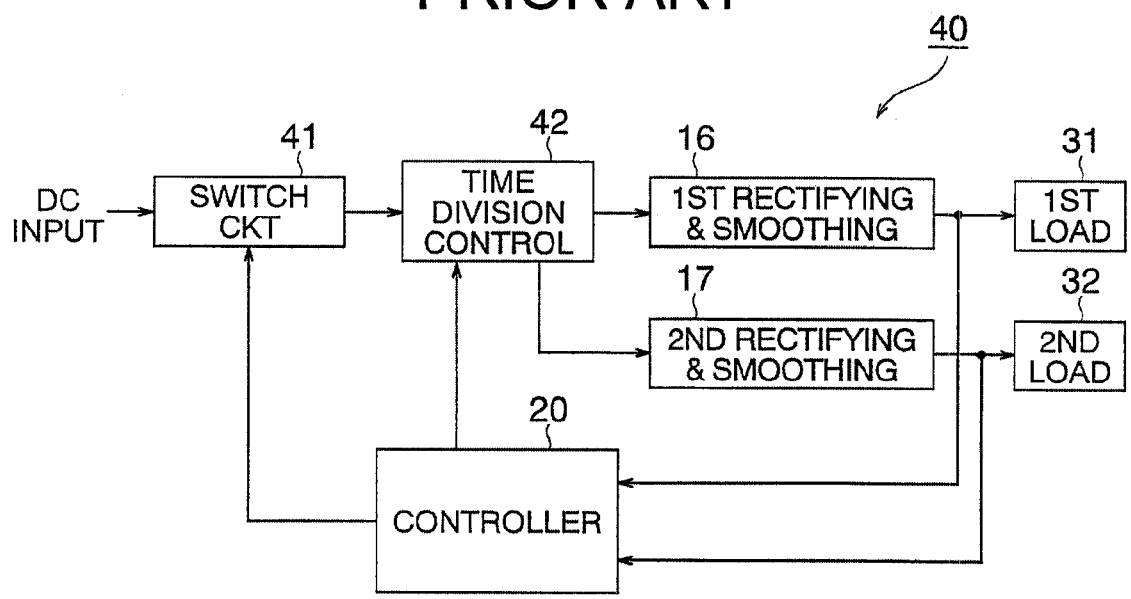
FIG. 2 is a block diagram showing structure of a conventional multi-output type DC/DC converter.

As described above, the division type DC/DC converter 10 comprises the first and the second switch circuits 11 and 12 and the first and the second control circuits 16 and 17, individually, for the first and the second loads 31 and 32. In addition, although one of the first and the second loads 31 and 32 becomes light, power (energy) is supplied to the above-mentioned one at a fixed frequency. In the manner which is described above, each of the first and the second switch circuits 11 and 12 comprises the coil (inductor) which is not illustrated in FIG. 1. Accordingly, the division type DC/DC converter requires the coils (the inductors) which are equal in number to the outputs. Referring to FIG. 2, the description will proceed to a conventional multi-output type DC/DC converter 40. In the example being illustrated, the multi-output type DC/DC converter 40 illustrates a case where loads (outputs) are equal in number two.

The illustrated multi-output type DC/DC converter 40 comprises a switch circuit 41, a time division control circuit 42, first and second rectifying and smoothing circuits 16 and 17, a controller 20. Although illustration is omitted, the switch circuit 41 comprises an inductor (a coil) and a main switch.

The switch circuit 41 switches an input voltage to produce an AC voltage. The time division control circuit 42 divides the AC voltage into first and second AC voltages. The first rectifying and smoothing circuit 16 rectifies and smoothes the first AC voltage to produce a first output voltage. The first output voltage is supplied to a first load 31. The second rectifying and smoothing circuit 17 rectifies and smoothes the second AC voltage to produce a second output voltage. The second output voltage is supplied to a second load 32. The controller 20 controls the switch circuit 41 so that the first and the second output voltages become desired voltages, respectively.

That is, the multi-output type DC/DC converter 40 supplies the first and the second loads 31 and 32 with necessary energy by carrying out time-division control to divide a switching frequency (to pre-assign time slots). Such a multi-output type DC/DC converter is disclosed, for example, in the above-mentioned JP 2004-96816 A.

In the conventional multi-output type DC/DC converter 40 illustrated in FIG. 2, by regulating an ON time interval (a duty factor) in the switch circuit 41 for respective loads each switching period (the time slot), each load is supplied with necessary power. In other words, in the multi-output type DC/DC converter 40, the time slots are pre-assigned with each load and each load is supplied with necessary power within each time slot. Accordingly, it is necessary to make a current flowing in the inductor zero until an end time point of each time slot. Otherwise, magnetic energy left in the inductor is released in another load at the next time slot.

As described above, an operation mode making the multi-output DC/DC converter so as to make the current flowing in the inductor zero before switching from a time slot to the next time slot is called a "current discontinuous mode" in the art. On the other hand, another operation mode making the multi-output DC/DC converter in a state where the current flowing in the inductor does not become zero at a time instant when a time slot is switched to the next time slot is called a "current continuous mode" in the art.

In the conventional multi-output type DC/DC converter 40 illustrated in FIG. 2, there is a phenomenon such that the current flowing in the inductor does not become zero in an abnormal condition where any of the loads becomes an over-load. In order to resolve this problem, the above-mentioned JP 2004-96816 A discloses a technical idea which can make the current flowing in the inductor zero at the abnormal condition such as an over-load state. However, it is disadvantageous in that the controller 20 has a complicated structure because a complicated control is required to realize the technical idea.

In addition, a switching power supply circuit or a switching regulator using a single inductor is known, for example, in the above-mentioned U.S. Pat. No. 6,900,620 issued by Nishimori et al. In the switching power supply circuit, time slots are pre-assigned with loads. It will be assumed that the loads are equal in number two. In this even, the time slots are alternately assigned the two loads. The switching power supply circuit regulates, in accordance with weight of the loads, a time interval (duty factor) necessary for turning a main switch on in order to flow a current from an input power supply to the single inductor. In addition, according to Nishimori et al, an embodiment is disclosed in which energy filling time intervals for the two loads are different from each other.

Furthermore, a two-output type DC/DC conversion circuit, which controls output voltages so as to keep constant by controlling an operation duty of a switching element using a single DC reactor, is disclosed, for example, in the above-mentioned JP 11-168876 A. Accordingly, in a two-output type converter, an ON time interval (duty factor) of the switching element varies in accordance with weight of the loads.

In addition, a multiple output back converter using a single inductor to control turning on/off of switching means by a pulse width modulator is disclosed, for example, in the above-mentioned U.S. Pat. No. 6,222,352 issued by Lenk. In the back converter according to Lenk, voltage outputs are regulated and controlled by controlling a duty cycle and an ON time interval of the switching means.

Disclosed in the above-mentioned patent documents, any multi-output type DC/DC converter regulates an ON time interval for turning switching means (a switch for flowing a current from an input power supply to an inductor) on in accordance with weight of loads. Accordingly, any multi-output type DC/DC converter, which is disclosed in the above-mentioned patent documents, can operate only at the current discontinuous mode, as mentioned in the preamble of this specification.

Figure 3:
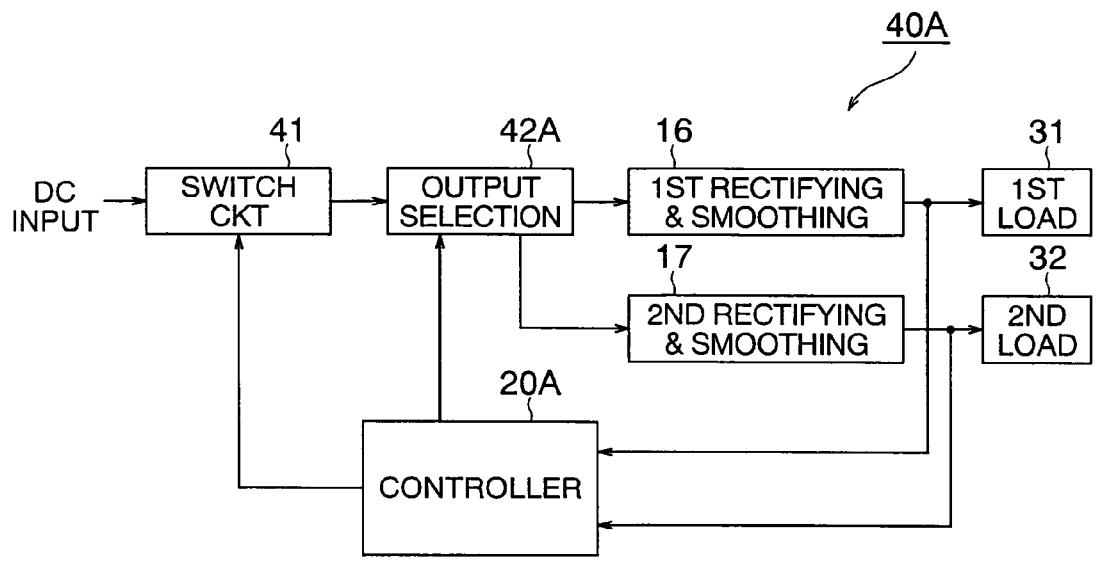
FIG. 3 is a block diagram showing structure of a multi-output type DC/DC converter according to this invention.

Referring to FIG. 3, the description will proceed to a principle of a multi-output type DC/DC converter 40A according to this invention. The description will be exemplified in a case where the first and the second output voltages are supplied to the first and the second loads 31 and 32. However, the number N of the loads may be three or more.

The illustrated multi-output type DC/DC converter 40A is similar in structure to the conventional multi-output type DC/DC converter 40 illustrated in FIG. 2 except that the multi-output type DC/DC converter 40A comprises an output selection circuit 42A in lieu of the time-division control circuit 42 and structure and a control operation of the controller are different from that illustrated in FIG. 2 in the manner which will later be described. Accordingly, the controller is depicted at a reference symbol of 20A. Ones having functions similar to those illustrated in FIG. 2 are depicted at the same reference symbols and the description for those is omitted in order to simplify the description.

In the multi-output type DC/DC converter 40A according to this invention, time slots are not pre-assigned with each load. In addition, in the multi-output type DC/DC converter 40A, an ON time interval for turning the main switch (which will later be described) in the switch circuit 41 on is always constant in a steady state without reference to weight of the loads.

The controller 20A generates a control signal on the basis of the first and the second output voltages. More specifically, the controller 20A decides that each load requires power (energy) by comparing the real first and second output voltages with output voltages required to the first and the second loads 31 and 32. On the basis of the decision result, the controller 20A supplies the energy to the load requiring the most energy for preference. In other words, the controller 20A determines frequency assigned with the time slots for each load in accordance with the power to be supplied to each load.

Inasmuch as the frequency assigned with the time slots for each load is determined in accordance with the power to be supplied to each load in this invention as mentioned before, it is possible to supply the power to the load having large power to be supplied for preference. With this structure, the multi-output type DC/DC converter 40A can produce the first and the second output voltages with stability and can suppress ripples thereof.

Although the conventional multi-output type DC/DC converter 40 can operate only at the current discontinuous mode in the manner which is described above, the multi-output type DC/DC converter 40A according to this invention can operate both at the current discontinuous mode and the current continuous mode in the manner which will later be described. For instance, the multi-output type DC/DC converter 40A operates at the current discontinuous mode when all of the loads are light while the multi-output type DC/DC converter 40A operates at the current continuous mode when all of the loads are heavy.

Figure 4:
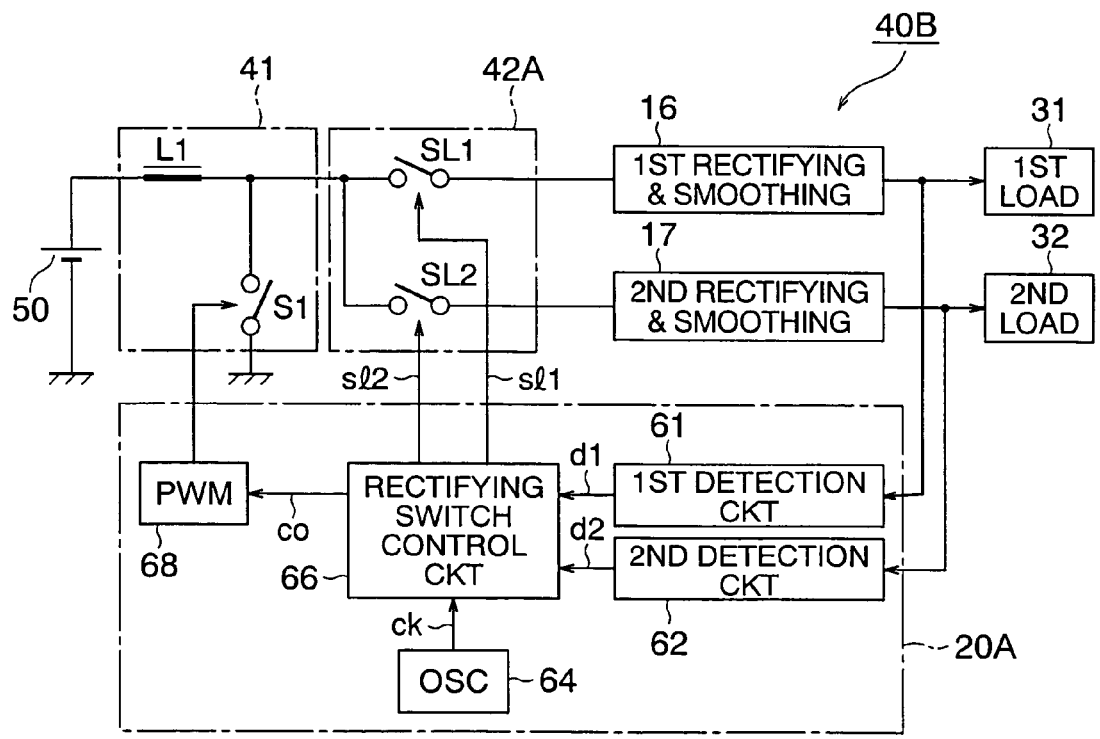
FIG. 4 is a block diagram showing structure of a multi-output type DC/DC converter according a first embodiment of this invention.

Referring to FIG. 4, the description will proceed to a multi-output type DC/DC converter 40B according to a first embodiment of this invention. The illustrated multi-output type DC/DC converter 40B is called a step-up type DC/DC converter because the multi-output type DC/DC converter 40B produces the first and the second output voltages each of which is higher than the input voltage.

In the illustrated multi-output type DC/DC converter 40B, the switch circuit 41 comprises an inductor L1 and a main switch S1. The inductor L1 has an end connected to a positive electrode of an input DC power supply 50 and another end which is grounded through the main switch S1. The input DC power supply 50 has a negative electrode which is grounded. Turning on/off of the main switch S1 is controlled by a PWM signal supplied from the controller 20A which will later be described. The switch circuit 41 having such structure is called a step-up type switch circuit.

The output selection circuit 42A comprises first and second selection switches SL1 and SL2. The first selection switch SL1 has an end connected to a connection point between the inductor L1 and the main switch S1 and another end connected to an input terminal of the first rectifying and smoothing circuit 16. The second selection switch SL2 has an end connected to the connection point between the inductor L1 and the main switch S1 and another end connected to an input terminal of the second rectifying and smoothing circuit 17. Turning on/off of the first selection switch SL1 is controlled by a first output selection signal sl1 supplied from the controller 20A. Turning on/off of the second selection switch SL2 is controlled by a second output selection signal sl2 supplied from the controller 20A.

The controller 20A comprises first and second detection circuits 61 and 62, an oscillator (OSC) 64, a rectifying switch control circuit 66, and a pulse width modulator (PWM) 68. The first detection circuit 61 detects the first output voltage produced by the first rectifying and smoothing circuit 16 to produce a first detected signal d1. The second detection circuit 62 detects the second output voltage produced by the second rectifying and smoothing circuit 17 to produce a second detected signal d2.

Although illustration is omitted, each of the first and the second detection circuits 61 and 62 comprises a reference voltage source for producing a reference voltage, a bleeder resistor for dividing the output voltage to produce a divided voltage, and an error amplifier for comparing the reference voltage with the divided voltage to produce a detected signal (an error signal). Each detected signal (error signal) is a voltage which decreases when the output voltage is higher than the desired voltage and which increases when the output voltage is lower than the desired voltage.

The oscillator 64 oscillates a clock signal ck having a predetermined clock frequency. The rectifying switch control circuit 66 generates, in synchronism with the clock signal ck supplied from the oscillator 64, the first and the second output selection signals sl1 and sl2 on the basis of the first and the second detected signals d1 and d2.

In addition, the rectifying switch control circuit 66 produces a control signal co for controlling the pulse width modulator 68. On the basis of the control signal co, the pulse width modulator 68 produces a pulse width modulated signal (PWM signal) for controlling turning on/off of the main switch S1. It is herein noted that the PWM signal produced by the pulse width modulator 68 has a duty factor which is always constant in a steady state without reference to the weight of the load to be supplied. In other words, in the steady state where load conditions of the first and the second loads 31 and 32 do not fluctuate, the pulse width modulator 68 generates the PWM signal having a constant duty factor.

In the multi-output type DC/DC converter 40B having such structure, the load to be released with the magnetic energy accumulated in the inductor L1 is selected on the basis of the first and the second detected signal d1 and d2 in the manner which will later be described.

Now, description will be made as regards operation of the multi-output type DC/DC converter 40B illustrated in FIG. 4.

Supplied to the first and the second loads 31 and 32, the first and the second output voltages are detected by the first and the second detection circuits 61 and 62 to obtain the first and the second detected signals d1 and d2, respectively. On the basis of the first and the second detected signals d1 and d2, the rectifying switch control circuit 66 decides whether the energy (the magnetic energy accumulated in the inductor L1) must be supplied to the first load 31 or the second load 32 and produces the first and the second output selection signals sl1 and sl2 and the control signal co on the basis of a decision result.

The description will proceed concretely. It will be assumed that the rectifying switch control circuit 66 decides that the energy must be supplied to the first load 31 in FIG. 4. In this event, on the basis of the control signal co from the rectifying switch control circuit 66, the PWM signal is produced by the pulse width modulator 68. When the PWM signal has a logic high level, the main switch S1 is turned on to accumulate the magnetic energy in the inductor L1. Under the circumstances, the first and the second selection switches SL1 and SL2 are put into an off state. It will be assumed that the PWM signal produced by the pulse width modulator 68 has a logic low level. Simultaneously, the rectifying switch control circuit 66 sends the first output selection signal sl1 to the first selection switch SL1. Therefore, the main switch S1 is turned off and the first selection switch SL1 is turned on to supply the magnetic energy accumulated in the inductor L1 to the first rectifying and smoothing circuit 16 as the current. Accordingly, the first output voltage is increased. As a result, the first load 31 is supplied with the energy (power).

On the other hand, it will be assumed that the rectifying switch control circuit 66 decides that the energy must be supplied to the second load 32 in FIG. 4. In this event, on the basis of the control signal co from the rectifying switch control circuit 66, the PWM signal is produced by the pulse width modulator 68. When the PWM signal has the logic high level, the main switch S1 is turned on to accumulate the magnetic energy in the inductor L1. Under the circumstances, the first and the second selection switches SL1 and SL2 are put into the off state. It will be assumed that the PWM signal produced by the pulse width modulator 68 has the logic low level. Simultaneously, the rectifying switch control circuit 66 sends the second output selection signal sl2 to the second selection switch SL2. Therefore, the main switch S1 is turned off and the second selection switch SL2 is turned on to supply the magnetic energy accumulated in the inductor L1 to the second rectifying and smoothing circuit 17 as the current. Accordingly, the second output voltage is increased. As a result, the second load 32 is supplied with the energy (power).

Although the description is exemplified in a case where the switch circuit 41 comprises the step-up type switch circuit in the multi-output type DC/DC converter 40B according to the first embodiment of this invention, the switch circuit 41 may comprise a step-down type switch circuit or a step-up and step-down type switch circuit which are known in the art.

Figure 5:
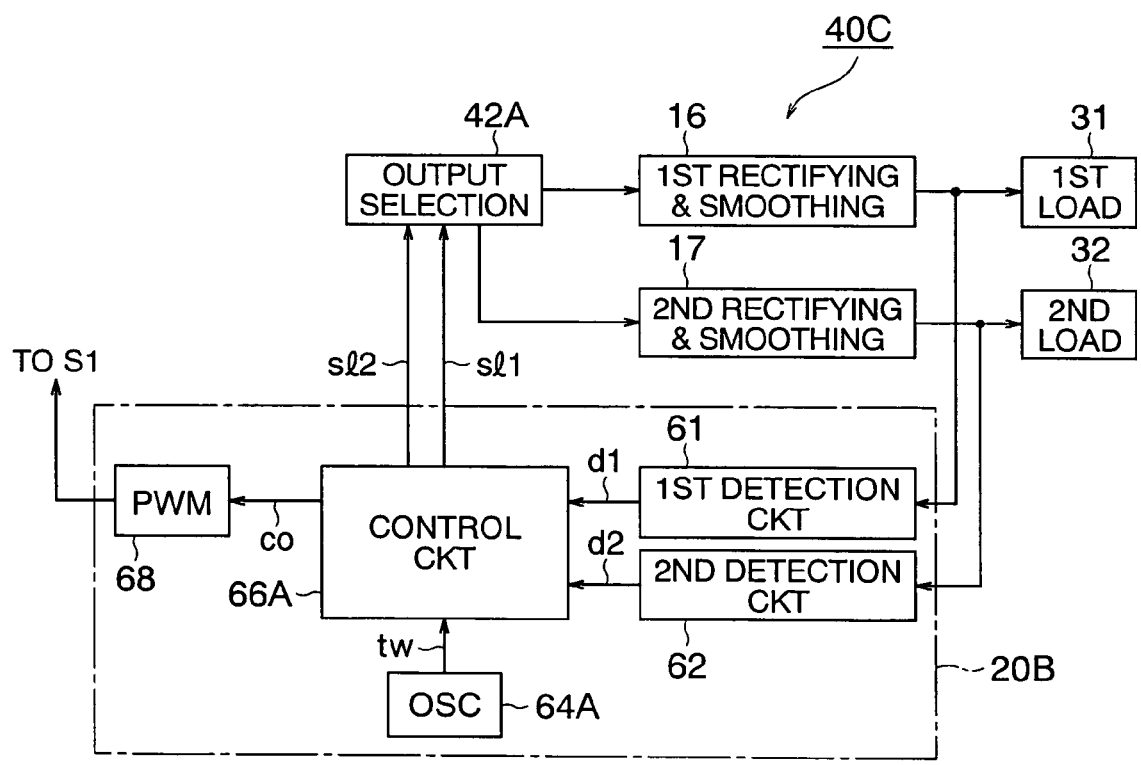
FIG. 5 is a block diagram showing structure of a multi-output type DC/DC converter according a second embodiment of this invention.

Referring to FIG. 5, the description will proceed to a multi-output type DC/DC converter 40C according to a second embodiment of this invention. The illustrated multi-output type DC/DC converter 40C is similar in structure and operation to the multi-output type DC/DC converter 40B illustrated in FIG. 4 except that structure of the controller is modified from that illustrated in FIG. 4 in the manner which will later be described. Accordingly, the controller is depicted at a reference symbol of 20B. In FIG. 5, ones having functions similar to those in FIG. 4 are depicted at the same reference symbols and the description thereof is omitted in order to simplify the description. In FIG. 5, the input DC power supply 50 and the switch circuit 41 illustrated in FIG. 4 are omitted.

The illustrated controller 20B is similar in structure and operation to that illustrated in FIG. 4 except that structure of the oscillator is modified in the manner which will later be described and the controller 20B comprises a control circuit 66A in place of the rectifying switch control circuit 66. Therefore, the oscillator is depicted at a reference symbol of 64A.

The oscillator 64A generates a triangular wave signal tw as an oscillation signal. The control circuit 66A compares the triangular wave signal tw with the first and the second detected signals d1 and d2 to supply the first and the second output selection signal sl1 and sl2 to the output selection circuit 42A in the manner which will later be described. That is, the control circuit 66A compares the triangular wave signal tw with the first and the second detected signals d1 and d2 at a certain range to determine that the first load 31 or the second load 32 is to be selected.

Figure 6:
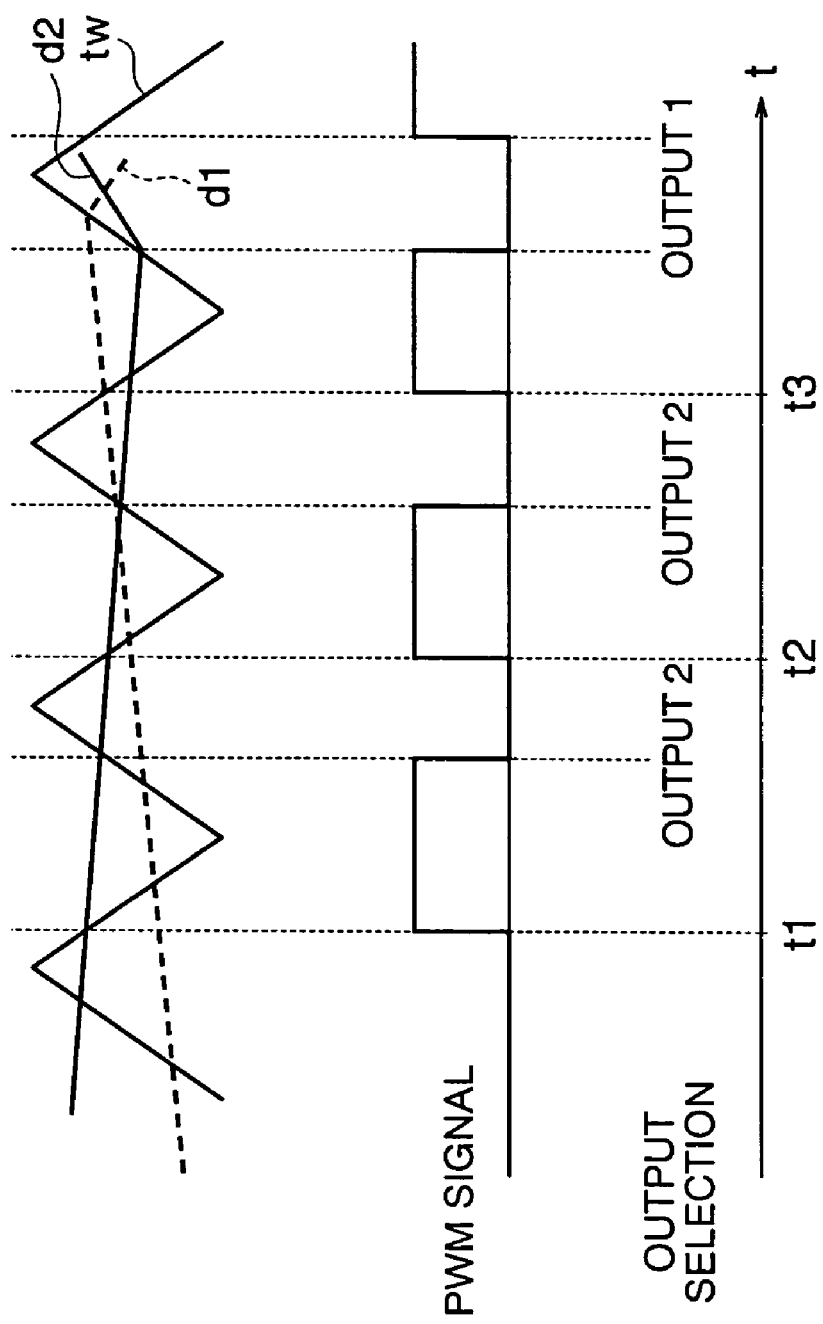
FIGS. 6A through 6C are time charts for use in describing operation of a control circuit in the multi-output type DC/DC converter illustrated in FIG. 5.

Referring to FIGS. 6A, 6B, and 6C in addition to FIG. 5, description will be made as regards operation of the controller 20B illustrated in FIG. 5 in more detailed. FIGS. 6A-C are time charts for use in describing the operation of the controller 20B. FIG. 6A shows the triangular wave signal tw, and the first and the second detected signals d1 and d2. FIG. 6B shows the PWM signal produced by the pulse width modulator 68. FIG. 6C shows the first and the output selection signals sl1 and sl2 produced by the control circuit 66A.

In the manner which is described above, the first and the second detected signals d1 and d2 have the voltage which decreases when the corresponding output voltage is higher than the desired voltage and which increases when the corresponding output voltage is lower than the desired voltage. Accordingly, on comparing the first detected signal d1 with the second detected signal d2, the load corresponding to the detected signal having a higher level is the load to be supplied with the energy.

As shown in FIG. 6A, the control circuit 66A determines whether the first detected signal d1 or the second detected signal d2 early coincides with (intersects) a level of the triangular wave signal tw in a section where the level of the triangular wave signal tw decrease from a vertex thereof.

That is, inasmuch as the second detected signal d2 early interesects the triangular wave signal tw at a time instant t1, the control circuit 66A determines that the second detected signal d2 is higher the second detected signal d1 at the time instant t1. This means that the second load 32 is supplied with the second output voltage lower than the desired voltage in comparison with the first load 31. That is, the control circuit 66A determines that the second load 31 is the load requiring the most energy and the energy must be supplied to the second load 32 for preference. Accordingly, the control circuit 66A sends, to the second selection switch SL2 (FIG. 4) of the output selection circuit 42A, the second output selection signal s12 for turning it on.

Inasmuch as the second detected signal d2 early intersects the triangular wave signal tw at a time instant t2 also, the control circuit 66A determines that the energy must be supplied to the second load 32 for preference. Accordingly, the control circuit 66A sends the second output selection signal s12 to the second selection switch SL2 (FIG. 4) of the output selection circuit 42A.

On the other hand, at a time instant t3, the first detected signal d1 early intersects the triangular wave signal tw. As a result, the control circuit 66A determines that the energy must be supplied to the first load 31 for preference. Accordingly, the control circuit 66A sends, to the first selection switch SL1 (FIG. 4) of the output selection circuit 42A, the first output selection signal sl1 for turning it on.

In the manner which is described above, the multi-output type DC/DC converter 40C supplies the energy with the load corresponding to the detected signal which early intersects the triangular wave signal tw at the vertex of the triangular wave signal tw as a base point.

Although the oscillator 64A oscillates the triangular wave signal as the oscillation signal in the above-mentioned embodiment, the oscillation signal may be another oscillation signal other than a rectangular wave signal. Such oscillation signals may be, for example, a sawtooth signal or a sinusoidal signal. That is, the oscillation signal may be a signal with a waveform portion whose amplitude varies continuously.

Figure 7:
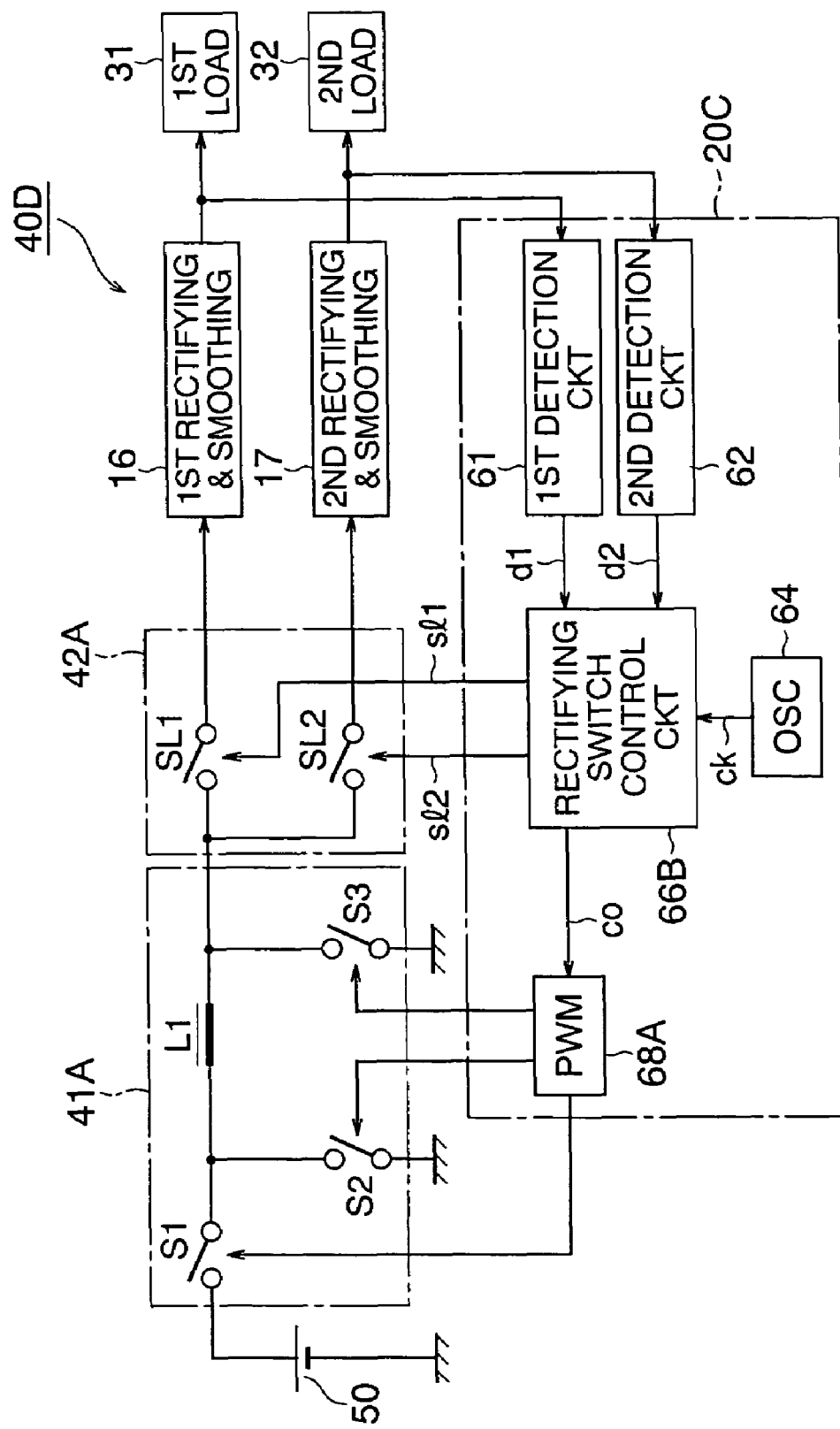
FIG. 7 is a block diagram showing structure of a multi-output type DC/DC converter according a third embodiment of this invention.

Referring to FIG. 7, the description will proceed to a multi-output type DC/DC converter 40D according to a third embodiment of this invention. The illustrated multi-output type DC/DC converter 40D is similar in structure and operation to the multi-output type DC/DC converter 40B illustrated in FIG. 4 except that structures of the switch circuit and the controller are modified in the manner which will later be described. Accordingly, the switch circuit and the controller are depicted at reference symbols of 41A and 20C, respectively. In FIG. 7, ones having functions similar to those illustrated in FIG. 4 are depicted at the same reference symbols and the description thereof is omitted in order to simplify the description.

The illustrated switch circuit 41A comprises first through third switches S1, S2, and S3 and the inductor L1. The first switch S1 acts as the main switch. The first switch S1 has an end connected to the positive electrode of the input DC power supply 50 and another end which is connected to an end of the inductor L1 and an end of the second switch S2. The second switch S2 has another end which is grounded. The inductor L1 has another end which is connected to the input terminal of the output selection circuit 42A and an end of the third switch S3. The third switch S3 has another end which is grounded. Turning on/off of the first through the third switches S1 to S3 is controlled by first through third PWM signals supplied from the controller 20C, respectively, which will later be described.

The switch circuit 41A having such structure is operable at any of a step-up type, a step-up and step-down type, and a step-down type under the control of the controller 20C which will later be described.

The controller 20C is similar in structure to the controller 20A illustrated in FIG. 4 except that operations of the pulse width modulator and the rectifying switch control circuit are different from those illustrated in FIG. 4 in the manner which will later be described. Accordingly, the pulse width modulator and the rectifying switch control circuit are depicted at reference symbols of 68A and 66B, respectively.

Now, description will be made as regards operation of the multi-output type DC/DC converter 40D illustrated in FIG. 7. Herein, the description is exemplified in a case where the first output voltage to be supplied to the first load 31 is higher than the input voltage of the input DC power supply 50 and the second output voltage to be supplied to the second load 32 is lower than the input voltage of the input DC power supply 50. Accordingly, the multi-output type DC/DC converter 40D serves as the step-up type DC/DC converter for the first load 31 and serves as the step-down type DC/DC converter for the second load 32. Therefore, in this case, the switch circuit 41A is operable as a step-up and step-down type switch circuit in the manner which will later be described.

Supplied to the first and the second loads 31 and 32, the first and the second output voltages are detected by the first and the second detection circuits 61 and 62 and the first and the second detected signals d1 and d2 are produced by the first and the second detection circuits 61 and 62, respectively. On the basis of the first and the second detected signals d1 and d2, the rectifying switch control circuit 66B decides whether energy must be supplied to either the first load 31 or the second load 32. It will be assumed that the rectifying switch control circuit 66B decides that the energy must be supplied to the first load 31. In this event, the rectifying switch control circuit 66B controls the pulse width modulator 68A using the control signal co in the manner which will later be described, makes the pulse width modulator 68A generate the first through the third PWM signals so that the switch circuit 41A makes a step-up operation, and sends the first output selection signal sl1 to the output selection circuit 42A. Conversely, it will be assumed that the rectifying switch control circuit 66B decides that the energy must be supplied to the second load 32. In this event, the rectifying switch control circuit 66B controls the pulse width modulator 68A using the control signal co in the manner which will later be described, makes the pulse width modulator 68A generate the first through the third PWM signals so that the switch circuit 41A makes a step-down operation, and sends the second output selection signal sl2 to the output selection circuit 66B.

At first, the description will proceed to a case where the energy is supplied to the first load 31. In this event, the first and the third switches S1 and S3 are first turned on using the first and the third PWM signals generated from the pulse width modulator 68A to accumulate the magnetic energy in the inductor L1. Subsequently, the third switch S3 is turned off using the third PWM signal generated from the pulse width modulator 68A and the first selection switch SL1 is turned on using the first output selection signal sl1 to make the magnetic energy accumulated in the inductor L1 release to the first rectifying and smoothing circuit 16 as the current and to make the first rectifying and smoothing circuit 16 produce the first output voltage into which the input voltage is set up.

Next, the description will proceed to a case where the energy is supplied to the second load 32. In this event, the first and the third switches S1 and S3 are first turned on using the first and the third PWM signals generated from the pulse width modulator 68A to accumulate the magnetic energy in the inductor L1. Subsequently, the first and the third switches S1 and S3 are turned off using the first and the third PWM signals generated from the pulse width modulator 68A, the second switch S2 is turned on using the second PWM signal, the second selection switch SL2 is turned on using the second output selection signal sl2 to make the magnetic energy accumulated in the inductor L1 release to the second rectifying and smoothing circuit 17 as the current and to make the second rectifying and smoothing circuit 17 produce the second output voltage into which the input voltage is set down.

Figure 8:
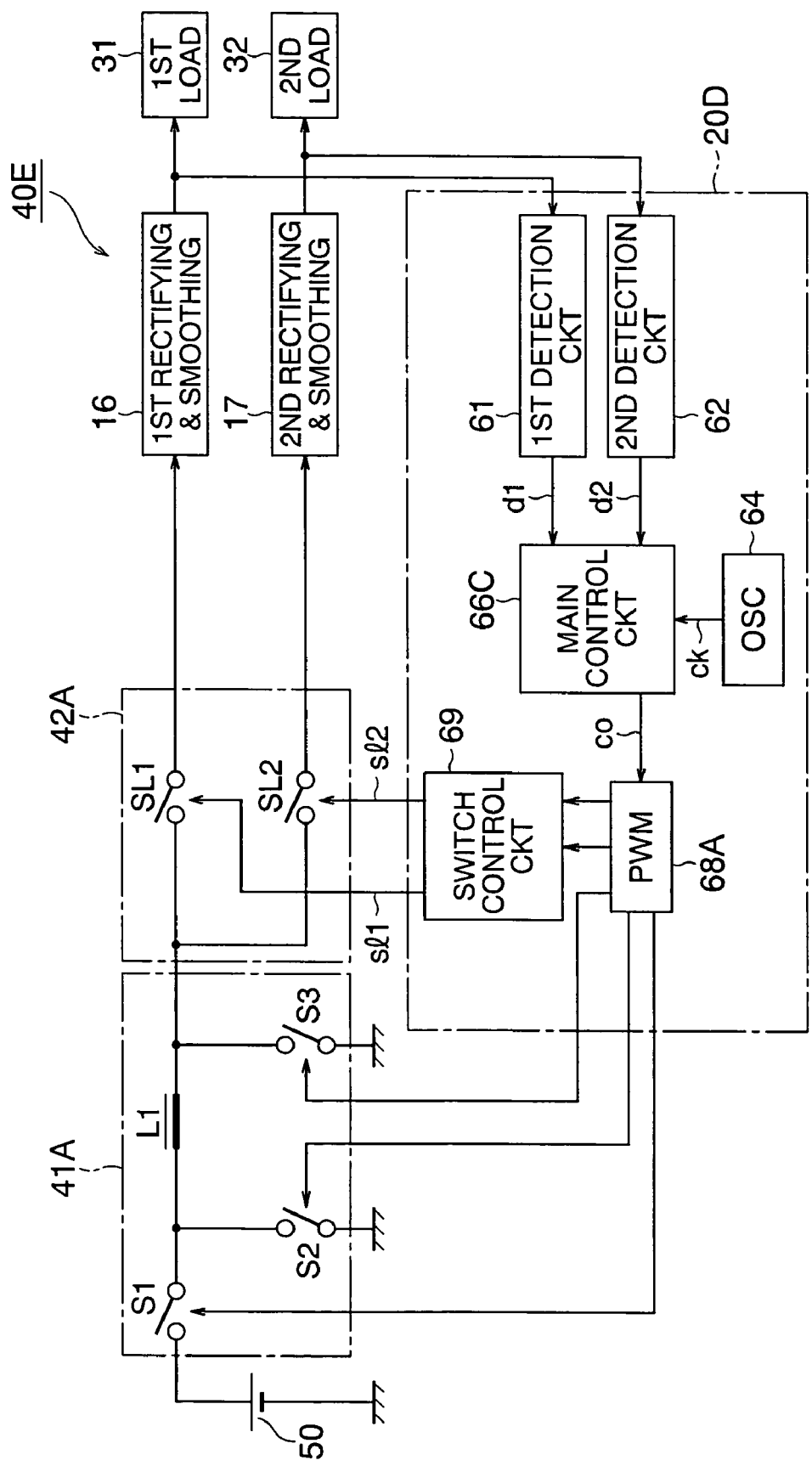
FIG. 8 is a block diagram showing structure of a multi-output type DC/DC converter according a fourth embodiment of this invention.

Referring to FIG. 8, the description will proceed to a multi-output type DC/DC converter 40E according to a fourth embodiment of this invention. The illustrated multi-output type DC/DC converter 40E is similar in structure and operation to the multi-output type DC/DC converter 40D illustrated in FIG. 7 except that structure of the controller is modified in the manner which will later be described. Accordingly, the controller is depicted at a reference symbol of 20D. In FIG. 8, ones having functions similar to those illustrated in FIG. 7 are depicted as the same reference symbols and the description thereof is omitted in order to simplify the description.

The controller 20D is similar in structure and operation to the controller 20C illustrated in FIG. 7 except that the controller 20D comprises a main control circuit 66C and a switch control circuit 69 on behalf of the rectifying switch control circuit 66A.

The main control circuit 66C sends, in synchronism with the clock signal ck supplied from the oscillator 64, the control signal co to the pulse width modulator 68A on the basis of the first and the second detected signals d1 and d2 supplied from the first and the second detection circuits 61 and 62. The switch control circuit 69 produces, using the PWM signal generated from the pulse width modulator 68A, the first and the second output selection signals sl1 and sl2 for controlling the turning on/off of the first and the second selection switches SL1 and SL2 of the output selection circuit 42A.

That is, the multi-output type DC/DC converter 20E controls, using the PWM signal generated from the pulse width modulator 68A, an on/off operation of the first and the second selection switches SL1 and SL2 of the output selection circuit 42A so as to link to an on/off operation of the first through the third selection switches S1 to S3.

Although operation in the multi-output type DC/DC converter 40E illustrated in FIG. 8 is similar to that of the afore-mentioned multi-output type DC/DC converter 40D illustrated in FIG. 7, the description thereof is omitted in order to simplify the description.

Figure 9:
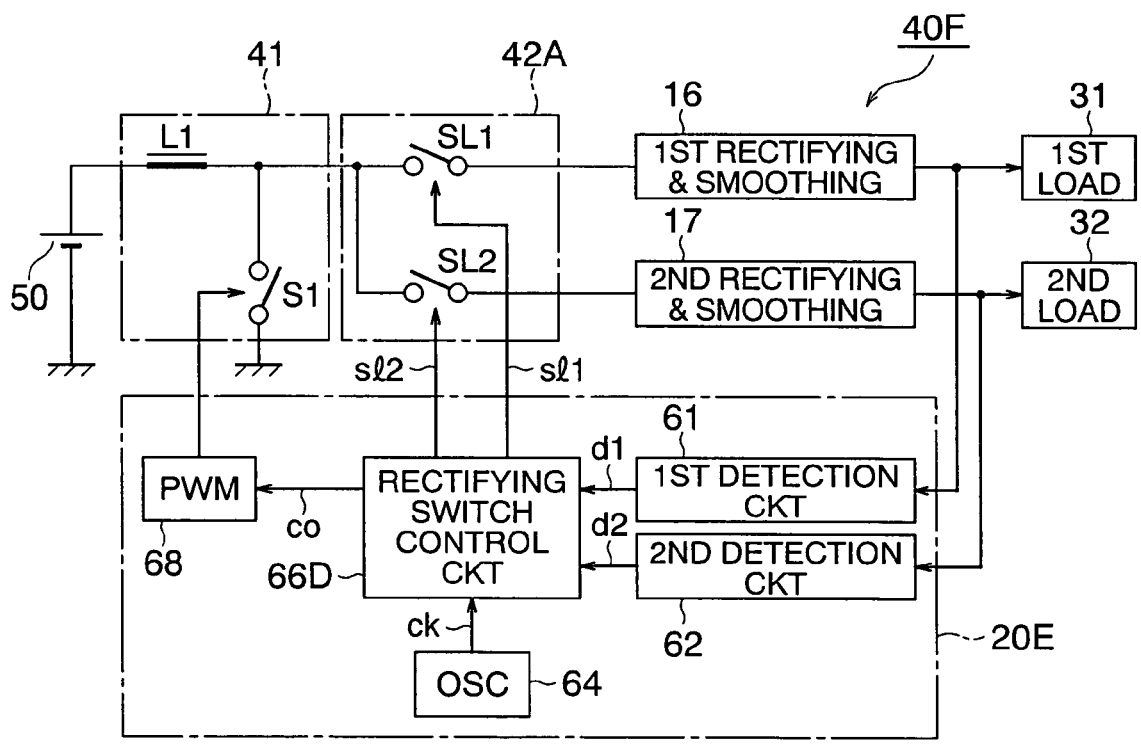
FIG. 9 is a block diagram showing structure of a multi-output type DC/DC converter according a fifth embodiment of this invention.

Referring now to FIG. 9, the description will proceed to a multi-output type DC/DC converter 40F according to a fifth embodiment of this invention. The illustrated multi-output type DC/DC converter 40F is similar in structure and operation to the multi-output type DC/DC converter 40B illustrated in FIG. 4 except that operation of the controller is different from that illustrated in FIG. 4 in the manner which will later be described. Accordingly, the controller is depicted at a reference symbol of 20E. In FIG. 9, ones having functions similar to those illustrated in FIG. 4 are depicted as the same reference symbols and the description thereof is omitted in order to simplify the description.

The controller 20E is similar in structure to the controller 20A illustrated in FIG. 4 except that operation of the rectifying switch control circuit is different from that illustrated in FIG. 4 in the manner which will later be described. Accordingly, the rectifying switch control circuit is depicted at a reference symbol of 66D.

The illustrated multi-output type DC/DC converter 40F can supply the first and the second loads 31 and 32 with the first and the second output voltages with stability although the weight of the first and the second loads 31 and 32 varies, in the manner which will later be described.

Referring now to FIGS. 10A through 10F in addition to FIG. 9, description will be made as regards operation of the multi-output type DC/DC converter 40F illustrated in FIG. 9. Herein, the description is exemplified in a case where the first load 31 becomes heavy and the second load 32 becomes light. FIGS. 10A through 10F are time charts for use in describing operation of the multi-output type DC/DC converter 40F. FIG. 10A shows an on/off state of the main switch S1. FIG. 10B shows an on/off state of the first selection switch SL1. FIG. 10C shows an on/off state of the second selection switch SL2. FIG. 10D shows the first output voltage produced by the first rectifying and smoothing circuit 16. FIG. 10E shows the second output voltage produces by the second rectifying and smoothing circuit 17. FIG. 10F shows a current flowing in the inductor L1.

Inasmuch as the first load 31 is heavy, the first output voltage produced by the first rectifying and smoothing circuit 16 lowers abruptly as shown in FIG. 10D. On the other hand, inasmuch as the second load 32 is light, the second output voltage produced by the second rectifying and smoothing circuit 17 lowers slightly as shown in FIG. 10E.

In this event, the rectifying switch control circuit 66D sends the control signal co to the pulse width modulator 68 to make the pulse width modulator 68 produce the PWM signal so as to control turning on/off of the main switch S1 of the switch circuit 41. Herein, it is noted that an ON time interval $T_{ON}$ of the main switch S1 is constant. In other words, the ON time interval $T_{ON}$ of each time slot is always constant in a steady state.

When the first switch S1 is turned on, the current flows from the input DC power supply 50 to the inductor L1 to accumulate the magnetic energy in the inductor L1.

On the other hand, the rectifying switch control circuit 66D decides, on the basis of the first and the second detected signals d1 and d2 produced by the first and the second detection circuits 61 and 62, whether the energy must be supplied to either the first load 31 or the second load 32. Inasmuch as the first load 31 is heavy and the second load 32 is light in the manner which is described above, the first output voltage lowers abruptly in comparison with the second output voltage. As a result, the rectifying switch control circuit 66D controls frequency of the energy to be supplied to the first load 31 so as to make much than frequency of the energy to be supplied to the second load 32.

In the example being illustrated, there is a repetition period Tp which consists of four time slots 4T. As shown in FIG. 10B, the rectifying switch control circuit 66D produces the first output selection signal sl1 for three time slots in the repetition period Tp to turn the first selection switch SL1 of the output selection circuit 42A on thereby releasing the magnetic energy accumulated in the inductor L1 to the first load 31 through the first rectifying and smoothing circuit 16 as the current three times during the repetition period Tp. On the other hand, as shown in FIG. 10C, the rectifying switch control circuit 66D produces the second output selection signal sl2 for one time slot in the repetition period Tp to turn the second selection switch SL2 of the output selection circuit 42A on thereby releasing the magnetic energy accumulated in the inductor L1 to the second load 32 through the second rectifying and smoothing circuit 17 as the current only one time during the repetition period Tp.

As shown in FIGS. 10D and 10D, it is therefore possible to supply the first and the second loads 31 and 32 with the first and the second output voltages with stability.

At any rate, in the manner which is described above, the multi-output type DC/DC converter 40F determines the frequency to be supplied the energy to each load in accordance with the weight of the loads.

Inasmuch as the frequency for selecting the second load 32 is less than the frequency for selecting the first load 31 in the case of this embodiment, it is possible to reduce ripples of the second output voltage, as shown in FIG. 10E.

Figure 10:
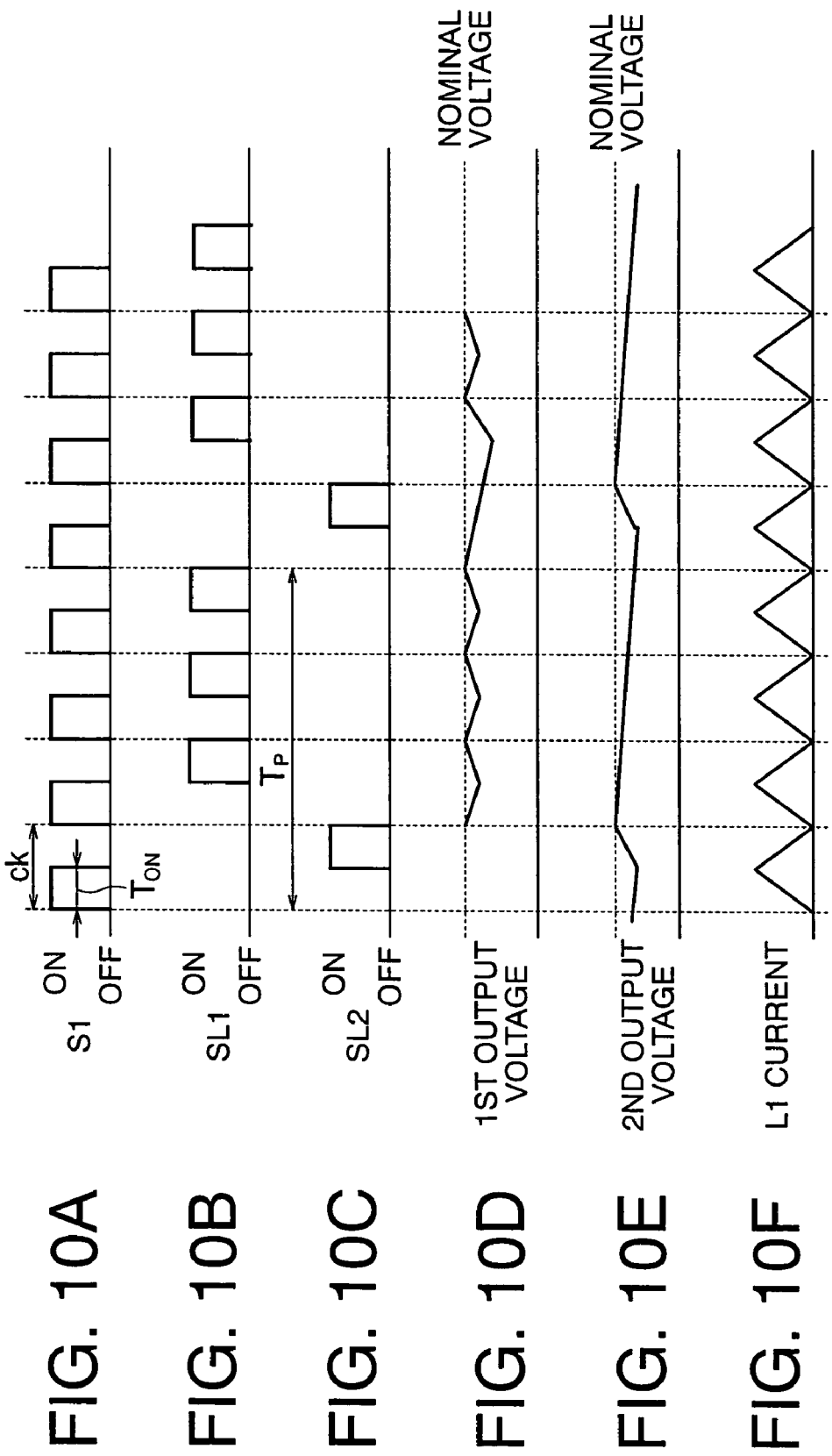
FIGS. 10A through 10F are time charts for use in describing operation of the multi-output type DC/DC converter illustrated in FIG. 9.

In addition, as shown in FIG. 10F, the current flowing in the inductor L1 becomes zero once immediately before changing from an time slot to the next time slot. Accordingly, it is understood that the multi-output type DC/DC converter 40F operates at the current discontinuous mode. The example illustrated in FIG. 10 shows a case where one load (the first load 31 in this example) is heavy and another load (the second load 32 in this example) is light. Accordingly, it is easily understood for those skilled in the art that the multi-output type DC/DC converter 40F operates at the current discontinuous mode when all of the loads are light.

Figure 11:
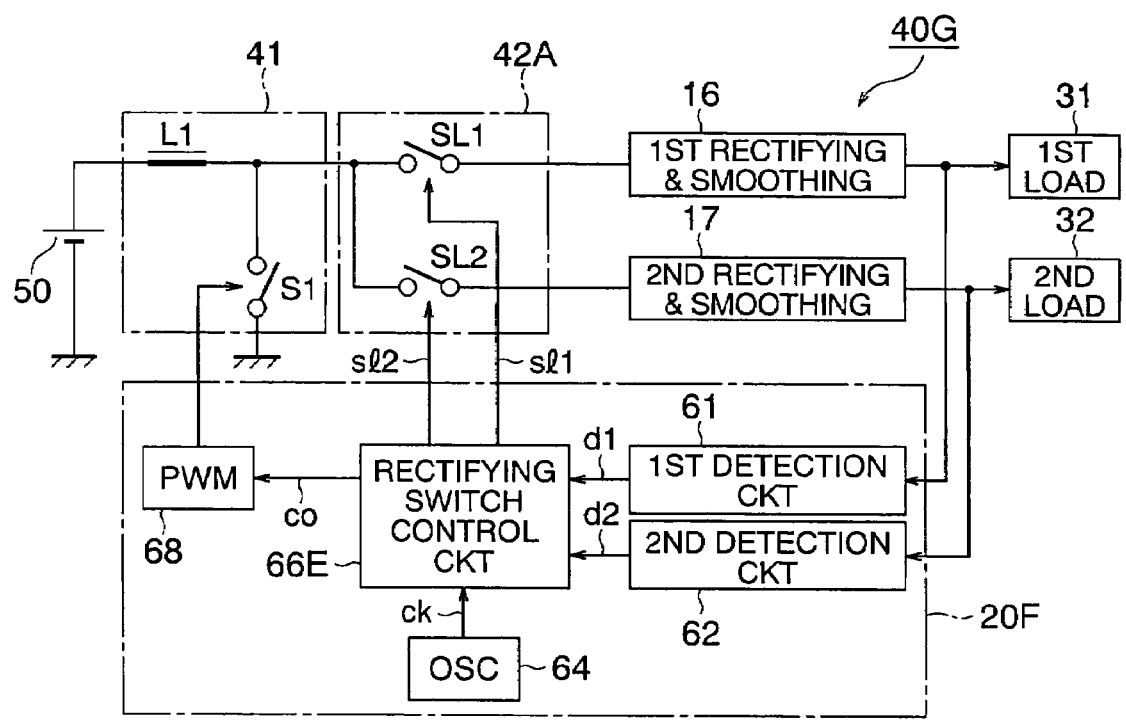
FIG. 11 is a block diagram showing structure of a multi-output type DC/DC converter according a sixth embodiment of this invention.

Referring now to FIG. 11, the description will proceed to a multi-output type DC/DC converter 40G according to a sixth embodiment of this invention. The illustrated multi-output type DC/DC converter 40G is similar in structure and operation to the multi-output type DC/DC converter 40B illustrated in FIG. 4 except that operation of the controller is different from that illustrated in FIG. 4 in the manner which will later be described. Accordingly, the controller is depicted at a reference symbol of 20F. In FIG. 11, ones having functions similar to those illustrated in FIG. 4 are depicted at the same reference symbols and the description thereof is omitted in order to simplify the description.

The controller 20F is similar in structure to the controller 20A illustrated in FIG. 4 except that operation of the rectifying switch control circuit is different from that illustrated in FIG. 4 in the manner which will later be described. Accordingly, the rectifying switch control circuit is depicted at a reference symbol of 66E.

The illustrated multi-output type DC/DC converter 40G shows an example which operates at the current continuous mode. Of course, the illustrated multi-output type DC/DC converter 40G is operable at either of the current continuous mode and the current discontinuous mode. More specifically, the multi-output type DC/DC converter 40G operates at the current discontinuous mode when all of the loads are light. The multi-output type DC/DC converter 40G operates at the current continuous mode when all of the loads are heavy. In addition, when one load is light and when another load is heavy, the multi-output type DC/DC converter 40G operates at either mode or both mode of the current continuous mode and the current discontinuous mode in accordance with a load condition.

Figure 12:
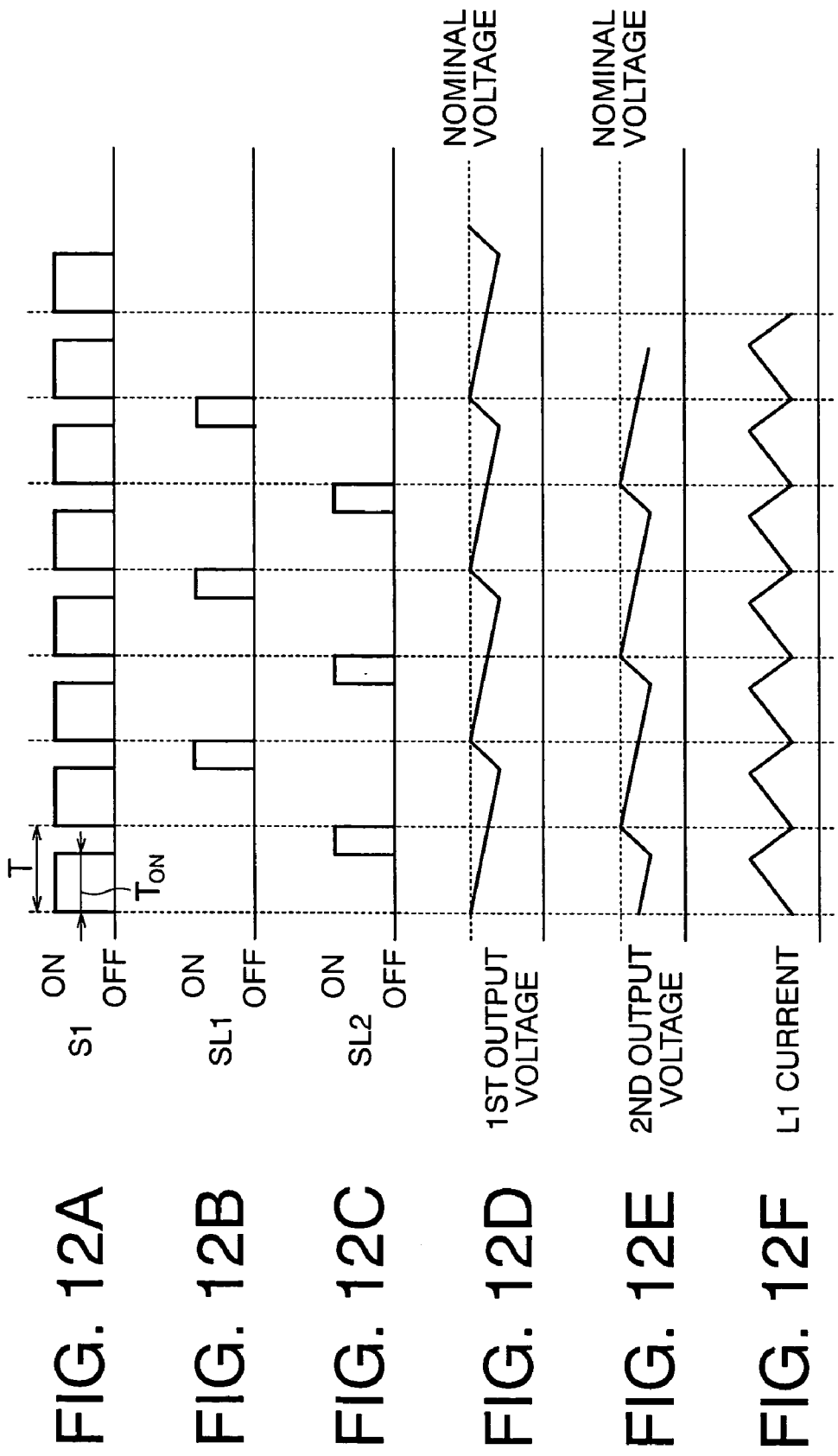
FIGS. 12A through 12F are time charts for use in describing operation of the multi-output type DC/DC converter illustrated in FIG. 11.

Referring now to FIGS. 12A through 12F in addition to FIG. 11, description will be made as regards operation of the multi-output type DC/DC converter 40G illustrated in FIG. 11. In the manner which is described above, both (all) of the first load 31 and the second load 32 are heavy. FIGS. 12A through 12F are time charts for use in describing operation of the multi-output type DC/DC converter 40G. FIG. 12A shows an on/off state of the main switch S1. FIG. 12B shows an on/off state of the first selection switch SL1. FIG. 12C shows an on/off state of the second selection switch SL2. FIG. 12D shows the first output voltage produced by the first rectifying and smoothing circuit 16. FIG. 12E shows the second output voltage produces by the second rectifying and smoothing circuit 17. FIG. 12F shows a current flowing in the inductor L1.

Inasmuch as both of the first and the second loads 31 and 32 are heavy, both of the first and the second output voltages produced by the first and the second rectifying and smoothing circuits 16 and 17 lower abruptly as shown in FIGS. 12D and 12E.

In this event, the rectifying switch control circuit 66E sends the control signal co to the pulse width modulator 68 to make the pulse width modulator 68 produce the PWM signal so as to control turning on/off of the main switch S1 of the switch circuit 41. Herein, it is noted that an ON time interval $T_{ON}$ of the main switch S1 is constant without reference to the loads to be supplied with the energy, as shown in FIG. 12A. In other words, the ON time interval $T_{ON}$ of each time slot is always constant in a steady state.

However, the ON time interval $T_{ON}$ of the main switch S1 illustrated in FIG. 12A is longer than the ON time interval $T_{ON}$ of the main switch S1 illustrated in FIG. 10A. This is because, this example is an example where both of the first and the second loads 31 and 32 are heavy and sufficient energy must be supplied to both of the first and the second loads 31 and 32.

When the first switch S1 is turned on, the current flows from the input DC power supply 50 to the inductor L1 to accumulate the magnetic energy in the inductor L1.

On the other hand, the rectifying switch control circuit 66E decides, on the basis of the first and the second detected signals d1 and d2 produced by the first and the second detection circuits 61 and 62, whether the energy must be supplied to either the first load 31 or the second load 32. Inasmuch as both of the first and the second loads 31 and 32 are heavy in the example being illustrated in the manner which is described above, the first and the second output voltages lower abruptly. As a result, the rectifying switch control circuit 66E controls so that frequency of the energy to be supplied to the first load 31 is equal to frequency of the energy to be supplied to the second load 32.

As shown in FIG. 12A, a rate (a duty factor) of the ON time interval $T_{ON}$ in an interval of the time slot T is large. As a result, as shown in FIG. 12F, the current flowing in the inductor L1 does not become zero at a time instant at which a time slot is switched to the next time slot. That is, the multi-output type DC/DC converter 40G operates at the current continuous mode. In addition, it is possible to decrease a peak current flowing in the inductor L1, as shown in FIG. 12F. Even though the multi-output type DC/DC converter 40G operates at the current continuous mode in the manner which is described above, the multi-output type DC/DC converter 40G can supply the first and the second loads 31 and 32 with the first and the second output voltages with stability, respectively, as shown in FIGS. 12D and 12E.

At any rate, in the manner which is described above, the multi-output type DC/DC converter 40G operates at the current continuous mode to enable to supply all loads with the output voltages with stability when all loads are heavy. The reason why can operate at the current continuous mode as well is as follows. Different from the conventional multi-output type DC/DC converter, the multi-output type DC/DC converter according to this invention carries out control so that the ON time interval $T_{ON}$ of the main switch S1 in each time slot T becomes always constant in the steady state without reference to the weight of the loads.

Figure 13:
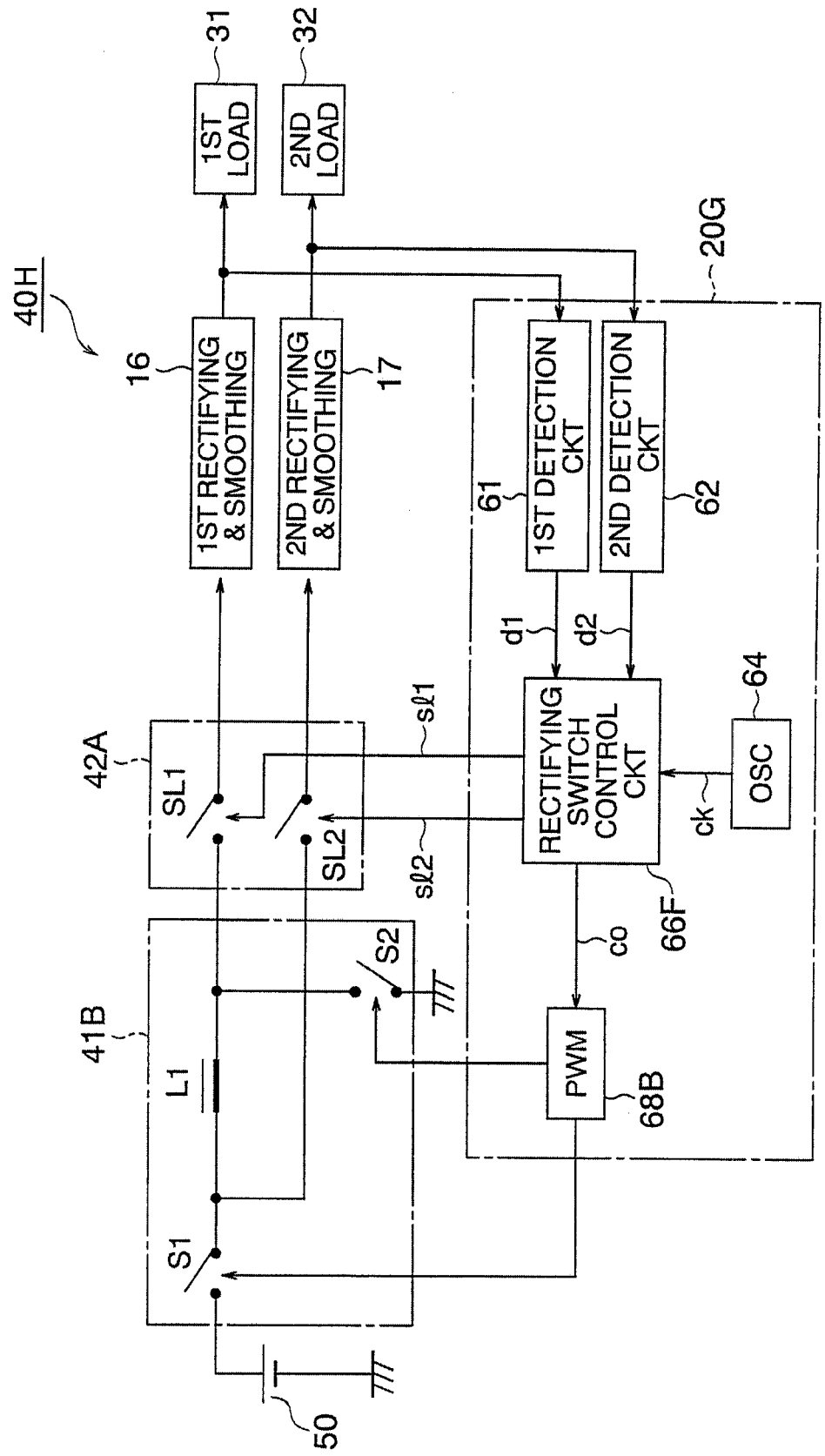
FIG. 13 is a block diagram showing structure of a multi-output type DC/DC converter according a seventh embodiment of this invention.

Referring to FIG. 13, the description will proceed to a multi-output type DC/DC converter 40H according to a seventh embodiment of this invention. The illustrated multi-output type DC/DC converter 40H is similar in structure and operation to the multi-output type DC/DC converter 40B illustrated in FIG. 4 except that structures of the switch circuit and the controller are modified from those illustrated in FIG. 4 in the manner which will later be described. Accordingly, the switch circuit and the controller are depicted at reference symbols of 41B and 20G. In FIG. 13, ones having functions similar to those illustrated in FIG. 4 are depicted as the same reference symbols and the description thereof is omitted in order to simplify the description.

The illustrated switch circuit 41B comprises first and second switches S1 and S2 and an inductor L1. A combination of the first and the second switches S1 and S2 serves as the main switch. The first switch S1 has an end connected to the positive electrode of the input DC power supply 50 and another end connected to an end of the inductor L1. The inductor L1 has another end which is connected to the first input terminal of the output selection circuit 42A and which is connected to an end of the second switch S2. The second switch S2 has another end which is grounded. In addition, the other end of the first switch S1 is connected to the second input terminal of the output selection circuit 42A. Turning on/off of the first and the second switches S1 and S2 is controlled by first and second PWM signals supplied from the controller 20G, respectively, which will later be described.

The switch circuit 41B having such structure serves as a step-up type and a reverse type under the control of the controller 20G which will later be described.

In the output selection circuit 42A, the first selection switch SL1 has an end connected to the first input terminal thereof and another end connected to the input terminal of the first rectifying and smoothing circuit 16. The second selection switch SL2 has an end connected to the second input terminal of the output selection circuit 42A and another end connected to the input terminal of the second rectifying and smoothing circuit 17. In addition, each of the first and the second selection switches SL1 and SL2 may comprise a diode.

The controller 20G is similar in structure to the controller 20A illustrated in FIG. 4 except that operations of the pulse width modulator and the rectifying switch control circuit are different from those illustrated in FIG. 4 in the manner which will later be described. Accordingly, the pulse width modulator and the rectifying switch control circuit are depicted at reference symbols of 68B and 66F.

Now, description will be made as regards operation of the multi-output type DC/DC converter 40H illustrated in FIG. 13. The first output voltage to be supplied to the first load 31 is a step-up voltage which is higher than the input voltage of the input DC power supply 50. The second output voltage to be supplied to the second load 32 is a negative voltage into which the input voltage of the input DC power supply 50 is reversed. Accordingly, the multi-output type DC/DC converter 40H serves as the step-up type DC/DC converter for the first load 31 and serves as the reverse type DC/DC converter for the second load 32. Therefore, the switch circuit 41B acts as a step-up and reverse type switch circuit in the manner which will later be described.

Supplied to the first and the second loads 31 and 32, the first and the second output voltages are detected by the first and the second detection circuits 61 and 62 and the first and the second detected signals d1 and d2 are produced by the first and the second detection circuits 61 and 62, respectively. On the basis of the first and the second detected signals d1 and d2, the rectifying switch control circuit 66F decides whether the energy must be supplied to either the first load 31 or the second load 32. It will be assumed that the rectifying switch control circuit 66F decides that the energy must be supplied to the first load 31. In this event, the rectifying switch control circuit 66F controls the pulse width modulator 68B using the control signal co in the manner which will later be described to make the pulse width modulator 68B generate the first and the second PWM signals so that the switch circuit 41B carries out a step-up operation and sends the first output selection signal sl1 to the output selection circuit 42A. Conversely, it will be assumed that the rectifying switch control circuit 66F decides that the energy must be supplied to the second load 32. In this event, the rectifying switch control circuit 66F controls the pulse width modulator 68B using the control signal co in the manner which will later be described to make the pulse width modulator 68B generate the first and the second PWM signals so that the switch circuit 41B carries out a reverse operation and sends the second output selection signal sl2 to the output selection circuit 42A.

At first, description will proceed to a case where the energy is supplied to the first load 31. In this event, the first and the second switches S1 and S2 are first turned on using the first and the second PWM signals generated from the pulse width modulator 68B to accumulate the magnetic energy in the inductor L1. Subsequently, the second switch S2 is turned off using the second PWM signal generated from the pulse width modulator 68B and the first selection switch SL1 is turned on using the first output selection signal sl1 to release the magnetic energy accumulated in the inductor L1 to the first rectifying and smoothing circuit 16 as the current thereby making the first rectifying and smoothing circuit 16 generate the first output voltage to which the input voltage is set up.

Next, description will proceed to another case where the energy is supplied to the second load 32. In this event, the first and the second switches S1 and S2 are first turned on using the first and the second PWM signals generated from the pulse width modulator 68B to accumulate the magnetic energy in the inductor L1. Subsequently, the first switch S1 is turned off using the first PWM signal generated from the pulse width modulator 68B and the second selection switch SL2 is turned on using the second output selection signal sl2 to release the magnetic energy accumulated in the inductor L1 to the second rectifying and smoothing circuit 17 as the current thereby making the second rectifying and smoothing circuit 17 generate the second output voltage to which the input voltage is reversed.

Referring now to FIGS. 14A through 14G in addition to FIG. 13, description will be made as regards operation of the multi-output type DC/DC converter 40H illustrated in FIG. 13. Herein, the description is exemplified in a case where both (all) of the first and the second loads 31 and 32 are heavy. FIGS. 14A through 14G are time charts for use in describing operation of the multi-output type DC/DC converter 40H. FIG. 14A shows an on/off state of the first switch S1. FIG. 14B shows an on/off state of the second switch S2. FIG. 14C shows an on/off state of the first selection switch SL1. FIG. 14D shows an on/off state of the second selection switch SL2. FIG. 14E shows the first output voltage (the step-up voltage) produced by the first rectifying and smoothing circuit 16. FIG. 14F shows the second output voltage (the negative voltage) produces by the second rectifying and smoothing circuit 16. FIG. 14G shows a current flowing in the inductor L1.

Inasmuch as both of the first and the second loads 31 and 32 are heavy, absolute values of the first and the second output voltages produced by the first and the second rectifying and smoothing circuits 16 and 17 lower abruptly as shown in FIGS. 14E and 14F.

In this event, the rectifying switch control circuit 66F sends the control signal co to the pulse width modulator 68B to make the pulse width modulator 68B produce the first and the second PWM signals so as to control turning on/off of the first and the second switches S1 and S2 of the switch circuit 41B. Herein, in the example being illustrated, it is noted that an ON time interval $T_{on}$ where both (the main switch) of the first and the second switches S1 and S2 are turned on is constant without reference to the loads to be supplied with the energy. In other words, the ON time interval $T_{ON}$ of each time slot T is always constant in a steady state.

When both of the first and the second switches S1 and S2 are turned on, the current flows from the input DC power supply 50 to the inductor L1 to accumulate the magnetic energy in the inductor L1.

On the other hand, the rectifying switch control circuit 66F decides, on the basis of the first and the second detected signals d1 and d2 produced by the first and the second detection circuits 61 and 62, whether the energy must be supplied to either the first load 31 or the second load 32. Inasmuch as both of the first and the second loads 31 and 32 are heavy in the manner which is described above, both of the absolute values of the first and the second output voltages lower abruptly. As a result, the rectifying switch control circuit 66F controls so that frequency of the energy to be supplied to the first load 31 is equal to frequency of the energy to be supplied to the second load 32.

At any rate, as shown in FIGS. 14E and 14F, it is therefore possible for the multi-output type DC/DC converter 40H to supply the first and the second loads 31 and 32 with the first output voltage (the step-up voltage) and the second output voltage (the reversed voltage) with stability, respectively.

While this invention has thus far been described in conjunction with several preferred embodiments thereof, it will now readily possible for those skilled in the art to put this invention into various manners. For example, although the number of the loads are equal to two in the above-mentioned embodiments, the number N of the loads may be three or more.

What is claimed is:

1. A multi-output type DC/DC converter for generating, from an input voltage, a plurality of output voltages, the converter comprising:

a switch circuit to supply the plurality of output voltages to a plurality of loads corresponding thereto, the switch circuit comprising a main switch and an inductor, wherein when said main switch is turned on, a current flows in said inductor to accumulate magnetic energy in said inductor, and the main switch being turned on for a given ON time interval in each of a plurality of time slots to supply the output voltages; and a controller which controls the ON time interval to be the same in each of the time slots in a steady state, in which a weight of said plurality of loads does not change, without reference to respective weights of said plurality of loads, wherein said controller changes the ON time interval in accordance with the weight of said plurality of loads in a transient state in which the weight of said plurality of loads changes, and wherein said controller determines a frequency at which the time slots are assigned to each of the loads in accordance with power to be supplied to each of the loads.

2. The multi-output type DC/DC converter as claimed in claim 1, wherein said controller controls said multi-output type DC/DC converter to operate in a current discontinuous mode when all of said loads are light, and said controller controls said multi-output type DC/DC converter to operate in a current continuous mode when all of said loads are heavy.

3. The multi-output type DC/DC converter as claimed in claim 1, wherein said multi-output type DC/DC converter supplies energy to the load requiring the most energy for preference.

4. A method of controlling a multi-output type DC/DC converter for generating, from an input voltage, a plurality of output voltages using a switch circuit to supply the plurality of output voltages to a plurality of loads corresponding thereto, the switch circuit comprising a main switch and an inductor, wherein when said main switch is turned on, a current flows in said inductor to accumulate magnetic energy in said inductor, and the main switch being turned on for a given ON time interval in each of a plurality of time slots to supply the output voltages, said method comprising:

controlling the ON time interval to be the same in each of the time slots in a steady state, in which a weight of said plurality of loads does not change, without reference to respective weights of said plurality of loads, and changing the ON time interval in accordance with the weight of said plurality of loads in a transient state in which the weight of said plurality of loads changes; and determining a frequency at which the time slots are assigned to each of the loads in accordance with power to be supplied to each of the loads.

5. The method as claimed in claim 4, further comprising performing control so as to supply energy to the load requiring the most energy for preference.

6. The method as claimed in claim 4, further comprising performing control so as to make said multi-output type DC/DC converter operate in a current discontinuous mode when all of said loads are light and to make said multi-output type DC/DC converter operate in a current continuous mode when all of said loads are heavy.

7. A multi-output type DC/DC converter for generating, from an input voltage, first through N-th output voltages to supply said first through N-th output voltages to first through N-th loads, respectively, where N represents an integer which is not less than two, said multi-output type DC/DC converter comprising:

a switch circuit for switching said input voltage to produce an AC voltage, the switch circuit comprising a main switch and an inductor, wherein when said main switch is turned on, a current flows in said inductor to accumulate magnetic energy in said inductor;

first through N-th rectifying and smoothing circuits for producing said first through N-th output voltages;

an output selection circuit for selecting, as a selected rectifying and smoothing circuit, one of said first through N-th rectifying and smoothing circuits in each of a plurality of time slots to supply said AC voltage to said selected rectifying and smoothing circuit; and a controller for controlling turning on/off of said switch circuit and the selection in said output selection circuit in accordance with said first through N-th output voltages, said controller controlling an ON time interval, during which said main switch is turned on, to be the same in each of the time slots in a steady state, in which a weight of the loads does not change, without reference to respective weights of the loads, wherein said controller changes the ON time interval in accordance with the weight of the loads in a transient state in which the weight of the loads changes, and wherein said controller controls the selection in said output selection circuit in accordance with power to be supplied to said first through N-th loads on the basis of said first through N-th output voltages to determine a frequency at which the time slots are assigned to each of the loads.

8. The multi-output type DC/DC converter as claimed in claim 7, wherein said controller controls the selection in said output selection circuit so as to decide, as a decided load, one among said first though N-th loads that requires the most energy on the basis of said first though N-th output voltages to supply the decided load with energy for preference.

9. The multi-output type DC/DC converter as claimed in claim 7, wherein said controller controls said multi-output type DC/DC converter to operate in a current discontinuous mode when all of said loads are light, and said controller controls said multi-output type DC/DC converter to operate in a current continuous mode when all of said loads are heavy.

10. The multi-output type DC/DC converter as claimed in claim 7, wherein when said main switch is turned off, the magnetic energy accumulated in said inductor is released into said output selection circuit.

11. The multi-output type DC/DC converter as claimed in claim 10, wherein said output selection circuit comprises first through N-th selection switches which correspond to said first through N-th loads, respectively.

12. The multi-output type DC/DC converter as claimed in claim 11, wherein said controller comprises:

first through N-th detection circuits for detecting said first through N-th output voltages to produce first through N-th detected signals, respectively;

an oscillator for oscillating a clock signal;

a rectifying switch control circuit for producing, in synchronism with said clock signal, a control signal for controlling said main switch and first though N-th output selection signals for selecting said first through N-th selection switches on the basis of said first through N-th detected signals; and a pulse width modulator for generating a pulse width modulated signal for turning said main switch on/off on the basis of said control signal.

13. The multi-output type DC/DC converter as claimed in claim 11, wherein said controller comprises:

first through N-th detection circuits for detecting said first through N-th output voltages to produce first through N-th detected signals, respectively;

an oscillator for oscillating an oscillation signal with a waveform portion whose amplitude varies continuously;

a control circuit for comparing said oscillation signal with said first through N-th detected signals to produce a control signal for controlling said main switch and first though N-th output selection signals for selecting said first through N-th selection switches; and a pulse width modulator for generating a pulse width modulated signal for turning said main switch on/off on the basis of said control signal.

14. The multi-output type DC/DC converter as claimed in claim 11, wherein said controller comprises:

first through N-th detection circuits for detecting said first through N-th output voltages to produce first through N-th detected signals, respectively;

an oscillator for oscillating a clock signal;

a main control circuit for producing, in synchronism with said clock signal, a control signal on the basis of said first through N-th detected signals;

a pulse width modulator for generating a pulse width modulated signal for turning said main switch on/off on the basis of said control signal; and a switch control circuit for generating, on the basis of said pulse width modulated signal, first through N-th output selection signals for controlling turning on/off of said first though N-th output selection switches.

* * * * *